United States Patent [19]
Misawa et al.

[11] Patent Number: 5,732,564
[45] Date of Patent: Mar. 31, 1998

[54] HEAT PUMP APPARATUS AND METHOD FOR STABLE OPERATION WITH INHIBITION OF FOAMING

[75] Inventors: Makoto Misawa; Hirofumi Yoshihara, both of Iwata, Japan

[73] Assignee: Yamaha Hatsudoki Kabushiki Kaisha, Shizuoka, Japan

[21] Appl. No.: 597,389

[22] Filed: Feb. 8, 1996

[51] Int. Cl.$^6$ .................................................. F25B 41/04
[52] U.S. Cl. .............................. 62/218; 62/224; 62/503
[58] Field of Search ............................ 62/197, 503, 218, 62/220, 222

[56] References Cited

U.S. PATENT DOCUMENTS

| | | | |
|---|---|---|---|
| 4,646,527 | 3/1987 | Taylor | 62/503 X |
| 4,912,937 | 4/1990 | Nakamura et al. | 62/503 X |
| 5,605,058 | 2/1997 | Kurachi et al. | 62/503 |

Primary Examiner—Henry A. Bennett
Assistant Examiner—Susanne C. Tinker
Attorney, Agent, or Firm—Knobbe, Martens, Olson & Bear, LLP

[57] ABSTRACT

A heat pump apparatus which includes: an accumulator and a sub-accumulator for additionally accommodating the refrigerant arranged between the accumulator and the compressor, in which at least the accumulator or the sub-accumulator is provided with a flow control valve for controlling the refrigerant flow upstream of the accumulator or the sub-accumulator in association with the liquid refrigerant level detected by the level sensor; a bypass line with a bypass valve for bypassing the expansion valve, for controlling the opening of the bypass; and, preferably, a level sensor for sensing the liquid refrigerant level therein; thereby inhibiting the occurrence of foaming of the refrigerant and preventing the refrigerant from entering the compressor, especially at the start-up of the compressor.

10 Claims, 8 Drawing Sheets

HEAT PUMP APPARATUS AND METHOD FOR STABLE OPERATION WITH INHIBITION OF FOAMING

BACKGROUND

1. Field of the Invention

This invention relates to a heat pump apparatus used as an air conditioning apparatus or a refrigerator, comprising an accumulator for accommodating a refrigerant arranged upstream of a compressor, and, in particular, to such an apparatus which allows for stable operation by inhibiting the occurrence of so-called foaming, i.e., abrupt and intensive boiling of the refrigerant on the low pressure side of a refrigerant circulation line such as in the accumulator. In addition, this invention relates to a method for stable operation by inhibiting the occurrence of foaming.

2. Background of the Art

A heat pump apparatus functions as a heater and a cooler by switching the direction of the flow of the refrigerant. That is, an inside heat-exchanger functions as a condenser for heating the room while it functions as an evaporator for cooling the room. An outside heat-exchanger functions in the opposite way. The heat pump apparatus normally has an accumulator for accommodating the refrigerant in order to prevent a liquid return to a compressor. The liquid refrigerant level in the accumulator is controlled with sensors for sensing the level of liquid refrigerant, which sensors are installed at the respective upper and lower parts of the accumulator. The upper and lower limits are detected by the sensors, so that the level of liquid refrigerant can be constantly within a given range (see Japanese patent laid-open Hei5-180529/1993, for example). That is, at the upper limit of the level of liquid refrigerant, when the sensor detects that the level in the accumulator is reaching or exceeding the upper limit, the level is controlled so as to lower the level below the limit by narrowing the area of a cross section of the refrigerant circulation line upstream of the accumulator so as to reduce the amount of the refrigerant entering the accumulator.

A problem in the above conventional structures is that when the apparatus is shut off, because the pressure on the low pressure side increases, and the vaporized refrigerant is thereby liquefied, liquid refrigerant remains in the refrigerant circulation line upstream of the compressor, and when the apparatus is started up, the liquid refrigerant tends to flow into the compressor. The accumulator can prevent the refrigerant from entering the compressor to a certain degree. However, upon start-up of the heat pump apparatus, the pressure on the low pressure side of the refrigerant circulation line downstream of the expansion valve and upstream of the compressor is temporarily but drastically reduced, thereby causing so-called foaming, i.e., abrupt and intensive boiling of the refrigerant on the low pressure side of the refrigerant circulation line. When foaming occurs, the liquid refrigerant in the accumulator undergoes intensive boiling and turns into foam, thereby drastically increasing the volume of the refrigerant. In this situation, the above-mentioned conventional method, i.e., reducing the amount of the refrigerant entering the accumulator, cannot prevent foaming refrigerant from moving into the compressor above the upper limit, thereby causing damage to the compressor on a short- or long-term basis. Further, within the occurrence of foaming, when the sensor for sensing the upper level of liquid refrigerant detects the formed refrigerant and reduces the amount of the refrigerant entering the accumulator, the pressure inside the accumulator further decreases, thereby intensifying production of foam, resulting in more foaming refrigerant entering the compressor. Heretofore, no practicable and effective method was available to certainly prevent a liquid return (liquid includes foam) to the compressor at start-up.

SUMMARY OF THE INVENTION

The present invention has exploited a heat pump apparatus used as an air conditioning apparatus or a refrigerator, having an sub-accumulator downstream of the accumulator and upstream of the compressor. An objective of the present invention is to provide a heat pump apparatus and a method for stable operation without the occurrence of foaming of the refrigerant especially at the beginning of start-up of the compressor.

Namely, one important aspect of the present invention is a heat pump apparatus comprising a refrigerant circulation line through which a refrigerant circulates, said refrigerant circulation line comprising: a compressor for circulating said refrigerant; a condenser; an expansion valve; an evaporator; an accumulator for accommodating said refrigerant arranged upstream of said compressor; a sub-accumulator for additionally accommodating said refrigerant arranged between said accumulator and said compressor, at least said accumulator or said sub-accumulator being provided with a level sensor for sensing the liquid refrigerant level therein; and a flow control device for controlling the refrigerant flow upstream of at least said accumulator or said sub-accumulator in association with the liquid refrigerant level detected by said level sensor. In the above, liquid refrigerant includes foaming refrigerant. By the use of the sub-accumulator, even though the refrigerant flow is significantly reduced upon start-up, thereby reducing the pressure in the accumulator and producing foaming of the refrigerant, the foam does not flow into the compressor, since the foam in the accumulator and the sub-accumulator sufficiently expands so as not to further expand and the refrigerant flowing into the accumulator and the sub-accumulator is reduced. Accordingly, the life span of the compressor is improved. The above embodiment is characterized in mitigating the effect of foaming by reducing the amount of refrigerant flowing into the accumulator and the sub-accumulator. Another important embodiment to mitigate the effect of foaming is to increase the pressure on the low pressure side of the refrigerant circulation line.

That is, another important aspect of the present invention is a heat pump apparatus comprising a refrigerant circulation line through which a refrigerant circulates, said refrigerant circulation line comprising: the compressor; the condenser; the expansion valve; the evaporator; the accumulator; the sub-accumulator, at least said accumulator or said sub-accumulator provided with a level sensor for sensing the liquid refrigerant level therein; at least one bypass line arranged in parallel to said expansion valve, for bypassing said expansion valve, said at least one bypass line provided with a bypass valve therein; and a flow control device for controlling at least the opening of said expansion valve or the opening of said bypass valve in association with the liquid refrigerant level detected by said level sensor. By using at least one bypass line between the high pressure side and the low pressure side of the refrigerant circulation line, the pressure in the accumulator and the sub-accumulator can be significantly increased upon start-up, thereby efficiently mitigating the effect of foaming and thus preventing the refrigerant from entering the compressor.

In the above apparatus, a combination of the flow control device and the bypass line allows for better results than those obtained by each singly.

In addition, even better results can be obtained when the above heat pump apparatus further comprises a control unit for controlling said expansion valve, said bypass valve, and said flow control valve in such a way that: (a) at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, at least one step selected from the group consisting of (i) the opening of said expansion valve is enlarged; (ii) said at least one bypass valve is opened; and (iii) the opening of said flow control valve is completely opened, is conducted; and (b) at least after said given time period elapses after the start-up of said compressor or after the pressure in said refrigerant circulation line downstream of said expansion valve and upstream of said compressor reaches or exceeds said given level, when said level sensor detects the upper level of the refrigerant in at least said accumulator or said sub-accumulator at a given upper limit, at least one step selected from the group consisting of (i) the opening of said expansion valve is narrowed; (ii) said at least one bypass valve is closed; and (iii) the opening of said flow control valve is narrowed, is conducted.

Further, for more certain inhibition of foaming, the above heat pump apparatus comprises a control unit for controlling said expansion valve, said bypass valve, and said flow control valve in such a way that: (a) at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, at least one step selected from the group consisting of (i) the opening of said expansion valve is enlarged; (ii) said at least one bypass valve is opened; and (iii) the opening of said flow control valve is completely opened, is conducted; (b) subsequently to step (a), but at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, at least one step selected from the group consisting of (i) the opening of said expansion valve is further enlarged; (ii) said at least one bypass valve is completely opened; and (iii) the opening of said flow control valve completely opened, is conducted; (c) at least after said given time period elapses after the start-up of said compressor or after the pressure in said refrigerant circulation line downstream of said expansion valve and upstream of said compressor reaches or exceeds said given level, when said level sensor detects the upper level of the refrigerant in at least said accumulator or said sub-accumulator at a given upper limit, at least one step selected from the group consisting of (i) the opening of said expansion valve is narrowed; (ii) said at least one bypass valve is closed; and (iii) the opening of said flow control valve is opened, is conducted; and (d) subsequently to step (c), when said level sensor detects the upper level of the refrigerant in at least said accumulator or said sub-accumulator at a given upper limit, at least one step selected from the group consisting of (i) the opening of said expansion valve is further narrowed; (ii) the opening of said at least one bypass valve is further narrowed; and (iii) the opening of said flow control valve is further narrowed, is conducted.

Another important aspect of the present invention is to provide a method for stable operation of a heat pump apparatus comprising, in a refrigerant circulation line through which a refrigerant circulates, said refrigerant circulation line comprising: the compressor; the condenser; the expansion valve; the evaporator; the accumulator; and the sub-accumulator, said sub-accumulator provided with a level sensor for sensing the liquid refrigerant level in said sub-accumulator, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; and (c) reducing the amount of refrigerant flow upstream of at least said accumulator or said sub-accumulator when said upper level of the refrigerant detected by said level sensor reaches said predetermined upper limit, thereby inhibiting foaming of the refrigerant in at least said sub-accumulator. As described above in connection with the apparatus, by the use of a sub-accumulator, even though the refrigerant flow is significantly reduced upon start-up, thereby reducing the pressure in the accumulator and producing foaming of the refrigerant, the foam does not flow into the compressor, since the foam in the accumulator and the sub-accumulator expands to the extent that further significant expansion is not likely to occur, and the refrigerant flowing into the accumulator and the sub-accumulator is reduced. Accordingly, the life span of the compressor is improved. The above embodiment is characterized in mitigating the effect of foaming by reducing the amount of refrigerant flowing into the accumulator and the sub-accumulator. Another important embodiment to mitigate the effect of foaming is to increase the pressure on the low pressure side of the refrigerant circulation line.

That is, another important aspect of the present invention is a method for stable operation of a heat pump apparatus comprising, in a refrigerant circulation line through which a refrigerant circulates, said refrigerant circulation line comprising: the compressor; the condenser; the expansion valve; the evaporator; the accumulator; the sub-accumulator, at least one of said accumulator and said sub-accumulator provided with a level sensor for sensing the liquid refrigerant level therein; and at least one bypass line arranged in parallel to said expansion valve, for bypassing said expansion valve, said at least one bypass line provided with a bypass valve therein, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; and (c) at least enlarging the opening of said expansion valve or opening said bypass valve when said upper level of the refrigerant detected by said level sensor reaches said predetermined upper limit, thereby inhibiting foaming of the refrigerant in at least said sub-accumulator. In the above method, a combination of the control of the flow control valve and the control of the bypass valve allows for better results than those obtained by each singly.

In addition, even better results can be obtained when the method comprises the steps of (a) predetermining an upper limit of the level of the liquid refrigerant in at least said accumulator or said sub-accumulator so as to inhibit foaming of the refrigerant in at least said sub-accumulator; (b)

detecting the upper level of the liquid refrigerant in said at least said accumulator or said sub-accumulator by said level sensor after the start-up of said compressor; (c) at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, conducting at least one step selected from the group consisting of (i) the opening of said expansion valve is enlarged; (ii) said at least one bypass valve is opened; and (iii) the opening of said flow control valve is opened; and (d) at least after said given time period elapses after the start-up of said compressor or after the pressure in said refrigerant circulation line downstream of said expansion valve and upstream of said compressor reaches or exceeds said given level, when said level sensor detects the upper level of the refrigerant in at least said accumulator or said sub-accumulator at a given upper limit, conducting at least one step selected from the group consisting of (i) the opening of said expansion valve is narrowed; (ii) said at least one bypass valve is closed; and (iii) the opening of said flow control valve is narrowed, thereby inhibiting foaming of the refrigerant in at least said sub-accumulator.

Further, for more certain inhibition of foaming, the above method for stable operation comprises the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; (c) at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, conducting at least one step selected from the group consisting of (i) the opening of said expansion valve is enlarged; (ii) said at least one bypass valve is opened; and (iii) the opening of said flow control valve is opened; (d) subsequently to step (c), but at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, conducting at least one step selected from the group consisting of (i) the opening of said expansion valve is further enlarged; (ii) said at least one bypass valve is completely opened; and (iii) the opening of said flow control valve completely opened; (e) at least after said given time period elapses after the start-up of said compressor or after the pressure in said refrigerant circulation line downstream of said expansion valve and upstream of said compressor reaches or exceeds said given level, when said level sensor detects the upper level of the refrigerant in at least said accumulator or said sub-accumulator at a given upper limit, conducting at least one step selected from the group consisting of (i) the opening of said expansion valve is narrowed; (ii) said at least one bypass valve is closed; and (iii) the opening of said flow control valve is narrowed; and (f) subsequently to step (e), when said level sensor detects the upper level of the refrigerant in at least said accumulator or said sub-accumulator at a given upper limit, conducting at least one step selected from the group consisting of (i) the opening of said expansion valve is further narrowed; (ii) the opening of said at least one bypass valve is further narrowed; and (iii) the opening of said flow control valve is further narrowed.

In the aforesaid methods, in steps (c) and (e) in the immediately preceding method, for example, when the two conditions, i.e., the given time period elapses after the start-up of said compressor and the pressure in said refrigerant circulation line downstream of said expansion valve and upstream of said compressor reaches or exceeds the given level, are not met concurrently, either step (c) or (e) can be conducted. For example, when the given time period elapses but the pressure is still under the given level, it is possible to proceed to step (e). These procedures can be predetermined, depending on the characteristics of the apparatus. In addition, although at least said time or said pressure should be measured in the above method, and preferably, both are measured, it is not necessary to measure both of them. By the use of the sub-accumulator, even though the refrigerant flow is significantly reduced upon start-up, thereby reducing the pressure in the accumulator and producing foam of the refrigerant, the foam does not flow into the compressor, since the foam in the accumulator and the sub-accumulator expands to the extent that further significant expansion is not likely to occur, and the refrigerant flowing into the accumulator and the sub-accumulator is reduced. Accordingly, the life span of the compressor is improved.

In addition, it is possible to prevent the refrigerant from entering the compressor without a level sensor for sensing the liquid refrigerant level in the accumulator or the sub-accumulator. That is, the timing of recovering from the start-up condition can be determined based on time and/or pressure after the start-up, i.e., by employing at least one of the following steps: (a) before a given time period elapses after the start-up of said compressor, said bypass valve is open, and when said given time period elapses, said bypass valve is closed; (b) when the pressure in the refrigerant circulation cycle on the low pressure side is lower than a given level after the start-up of said compressor, said bypass valve is opened, and when the pressure reaches said given level, said bypass valve is closed; (c) before a given time period elapses after the start-up of said compressor, the opening of said expansion valve is enlarged from the initial setting, and when said given time period elapses, the opening of said expansion valve is returned to the initial setting; and (d) when the pressure in the refrigerant circulation cycle on the low pressure side is lower than a given level after the start-up of said compressor, the opening of said expansion valve is enlarged from the initial setting, and when the pressure reaches said given level, the opening of said expansion valve is returned to the initial setting. Accordingly, it is possible to exclude a level sensor from the aforesaid heat pump apparatus. That is, all of the embodiments described above can be practiced without a level sensor, although the use of the level sensor renders control easier and more reliable.

DETAILED DESCRIPTION OF THE PREFERRED EMBODIMENT

If the accumulator is large enough to hold all the foam inside so that no foam flows out of the accumulator, a sub-accumulator may not be required. However, using such a large accumulator is not practicable. By using a sub-accumulator, production of foam can be very efficiently inhibited. Although plural sub-accumulators are usually not necessary, multiple sub-accumulators can be used depending on the operating conditions. By the use of a sub-accumulator, even though the refrigerant flow is significantly reduced upon start-up, thereby reducing the pressure in the accumulator and producing foaming of the refrigerant, the foam does not flow into the compressor.

A level sensor for sensing the upper limit of liquid refrigerant can be installed at the upper part of an accumulator or a sub-accumulator. Heretofore, it was not practicable to prevent a liquid return to a compressor by detecting the upper level of liquid refrigerant in an accumulator because no sub-accumulator was installed. By using a sub-accumulator, it is possible to prevent said return by detecting the upper level of liquid refrigerant in the accumulator, because the sub-accumulator allows the foaming refrigerant to sufficiently expand so that no more significant expansion takes place in the accumulator and sub-accumulator, thereby allowing for reliable control of the level of liquid refrigerant. When a level sensor, which can detect both liquid refrigerant itself and foaming refrigerant, is installed in the sub-accumulator, liquid refrigerant return to the compressor can be securely prevented. For additional security, level sensors can be installed in both accumulator and sub-accumulator (s). In this invention, liquid refrigerant includes foaming refrigerant.

A flow control valve for adjusting the flow volume of refrigerant in the refrigerant circulation line is preferably installed upstream of the sub-accumulator or the accumulator and downstream of the evaporator or the expansion valve, more preferably between the four-way valve and the accumulator or the sub-accumulator, since the flow control valve can be efficiently used in both heating and cooling modes. In order to linearly control the refrigerant flow, the flow control valve should be of linear type. In addition, the expansion valve can function as a flow control valve. The closer the flow control valve is to the accumulator, the lower the amount of refrigerant enters the accumulator; however, the flow control valve can be installed anywhere upstream of the condenser because the sub-accumulator mitigates the effect of foaming. The flow control valve can also be installed between the accumulator and the sub-accumulator, so that the amount of refrigerant entering the sub-accumulator is reduced, and the pressure in the accumulator increases, thereby mitigating the effect of foaming. In this case, the flow control valve can be efficiently used in both heating and cooling modes.

A method to prevent a liquid return at the start-up of the heat pump apparatus, other than reduction of the refrigerant entering the accumulator described above, is to increase the pressure on the low pressure side of the refrigerant circulation line, e.g., the pressure in the accumulator. That is, by using a bypass line, the pressure on the low pressure side can be increased so that formation of foam can be significantly reduced.

The bypass line is provided with a valve, preferably a linear-type valve. The bypass line can be installed anywhere between the high pressure side and the low pressure side of the refrigerant circulation line, for example, bridging a point downstream of the compressor and a point downstream of the sub-accumulator (i.e., upstream of the compressor); a point downstream of the compressor and a point downstream of the evaporator (the outside heat-exchanger in the heating mode); and a point downstream of the compressor and a point upstream of the sub-accumulator. A preferable location is a location bridging a point downstream of the compressor and a point upstream of the compressor (downstream of the sub-accumulator).

To prevent the entry of the refrigerant to the compressor, a level sensor for sensing the liquid refrigerant level in the accumulator or the sub-accumulator need not be installed, although the level sensor is preferable. That is, the degree of production of foam can be determined by time. The foam further continuously develops and collapses, thereby getting smaller and disappearing. The timing of this stage can be measured. In addition, when liquid refrigerant is vaporized and drastically increases in volume, the pressure in the refrigerant circulation line on the low pressure side is increased by the vaporized refrigerant passing through the evaporator. The timing of this stage can be determined by measuring the pressure in the refrigerant circulation line on the low pressure side. When the timing is determined, by manipulating the bypass valve or the expansion valve, it is possible to prevent the liquid refrigerant from entering the compressor.

The present heat pump apparatus can be used as an air conditioning apparatus as well as refrigerator. When the heat pump apparatus has both heating and cooling modes, especially when used as an air conditioning apparatus, the use of a four-way valve is advantageous to switch the direction of the refrigerant flow, as described later. In the heat pump apparatus, an inside heat-exchanger and an outside heat-exchanger can function as a condenser or an evaporator, depending on the operation mode, the heating mode or the cooling mode.

EMBODIMENT 1

Sub-Accumulator with Level Sensor
Basic Structures of Heat Pump Apparatus

Figure 1:
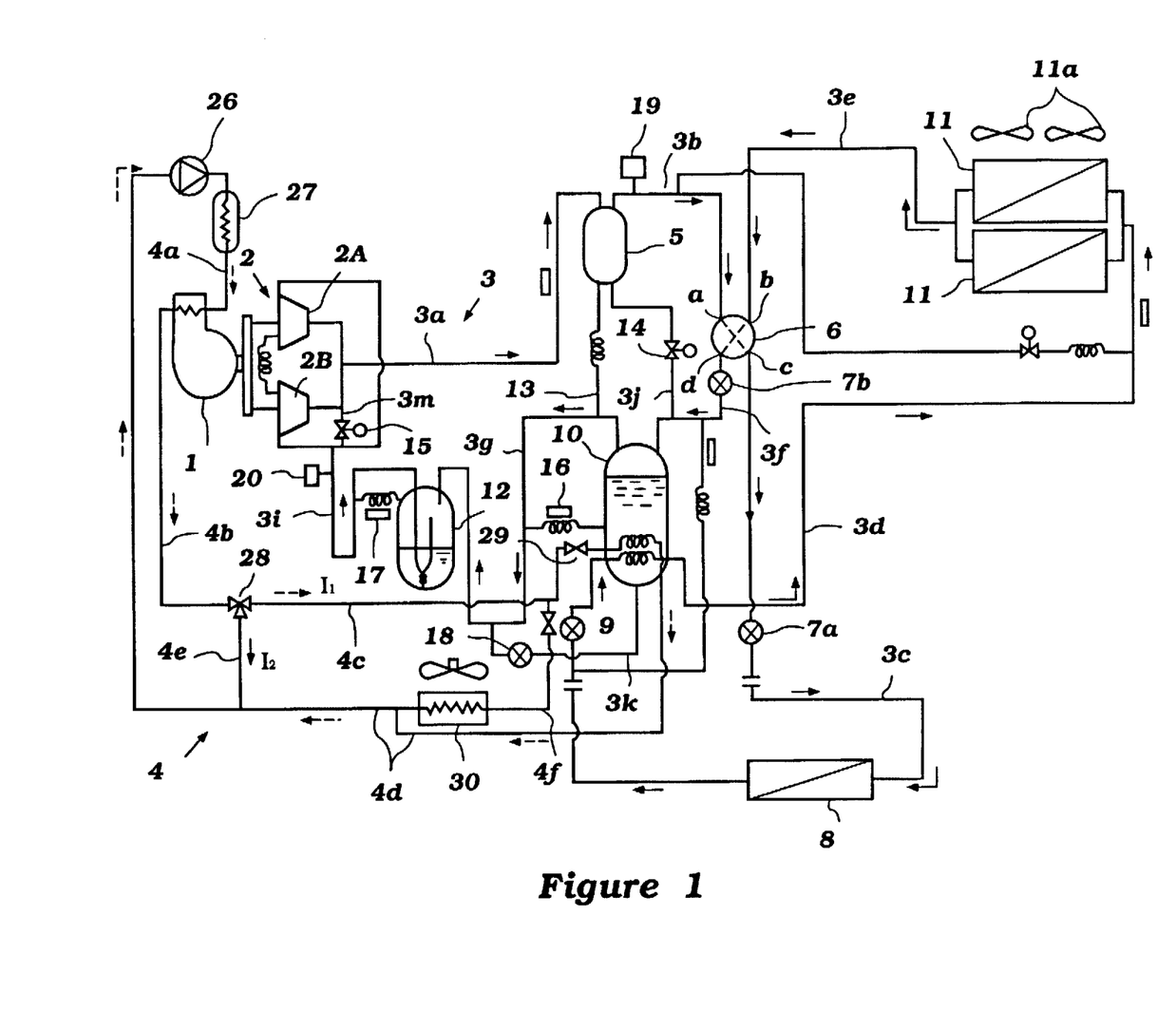
FIG. 1 is a schematic circuit illustrating basic structures of an engine-driven heat pump apparatus according to the first embodiment of the present invention.
Figure 2:
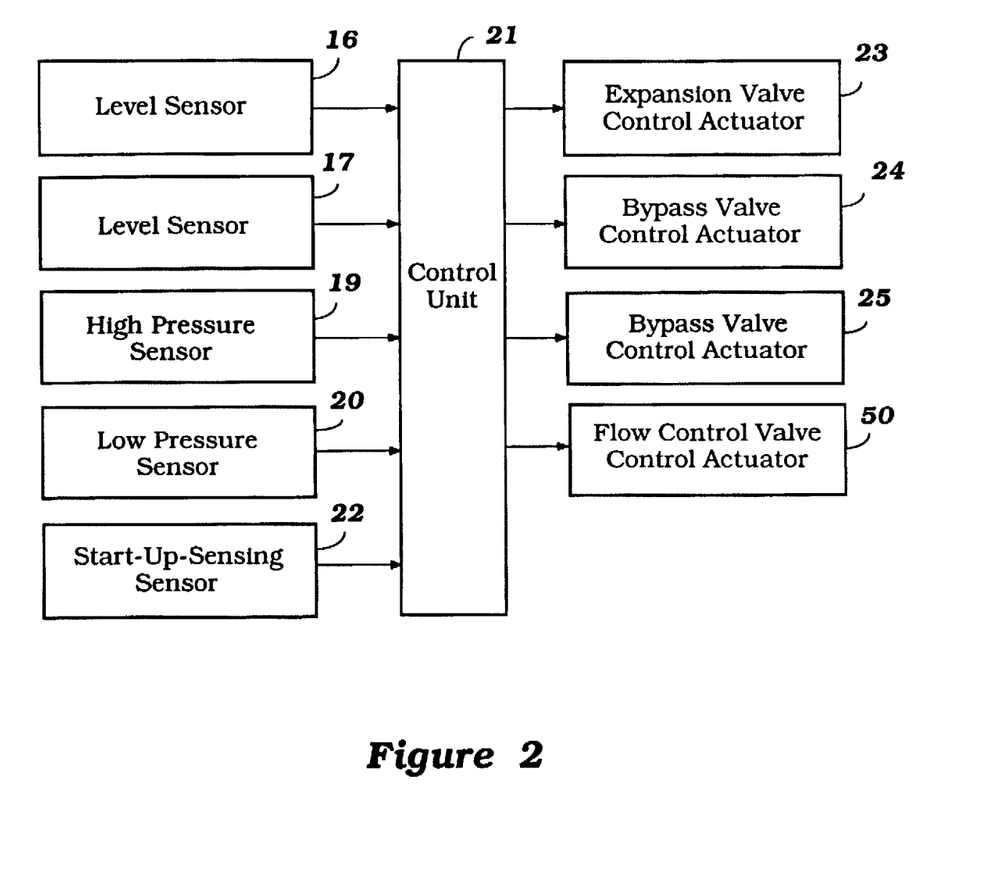
FIG. 2 is a block chart illustrating a control system used in an engine-driven heat pump apparatus according to the first embodiment of the present invention.
Figure 3:
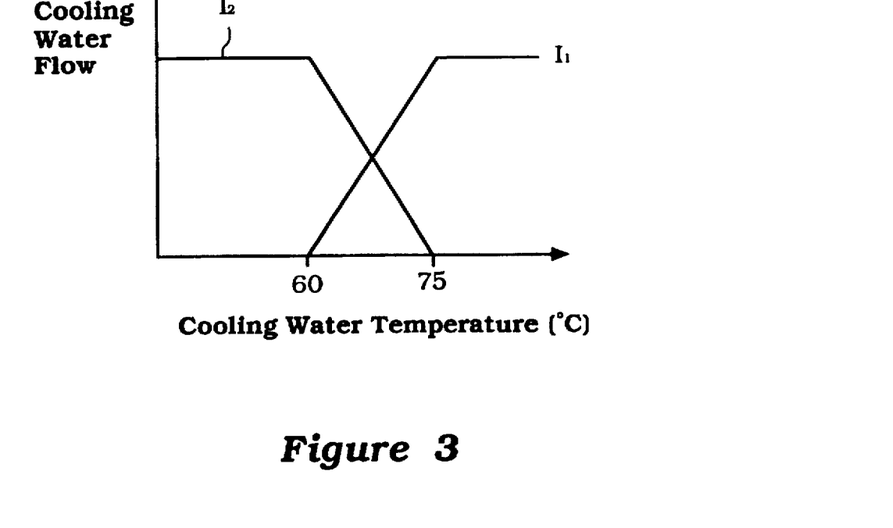
FIG. 3 is a schematic graph showing a specific characteristic of a temperature-sensitive three-way valve used in a cooling water circulation line.
Figure 4:
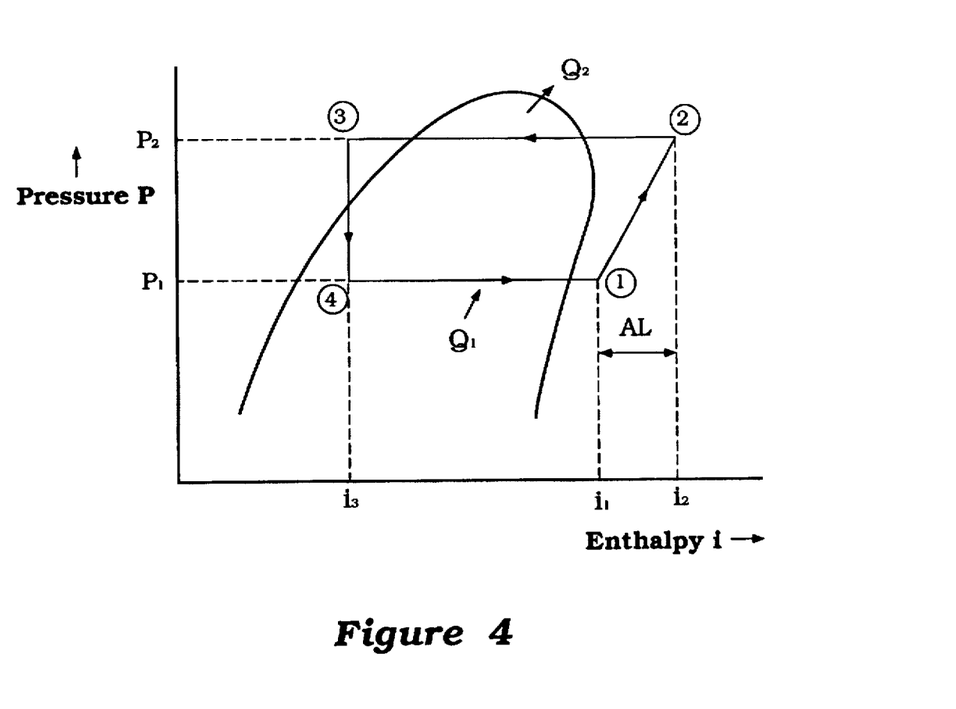
FIG. 4 is a p-i chart showing changes in pressure and enthalpy of a refrigerant in a heating or cooling cycle.
Figure 5:
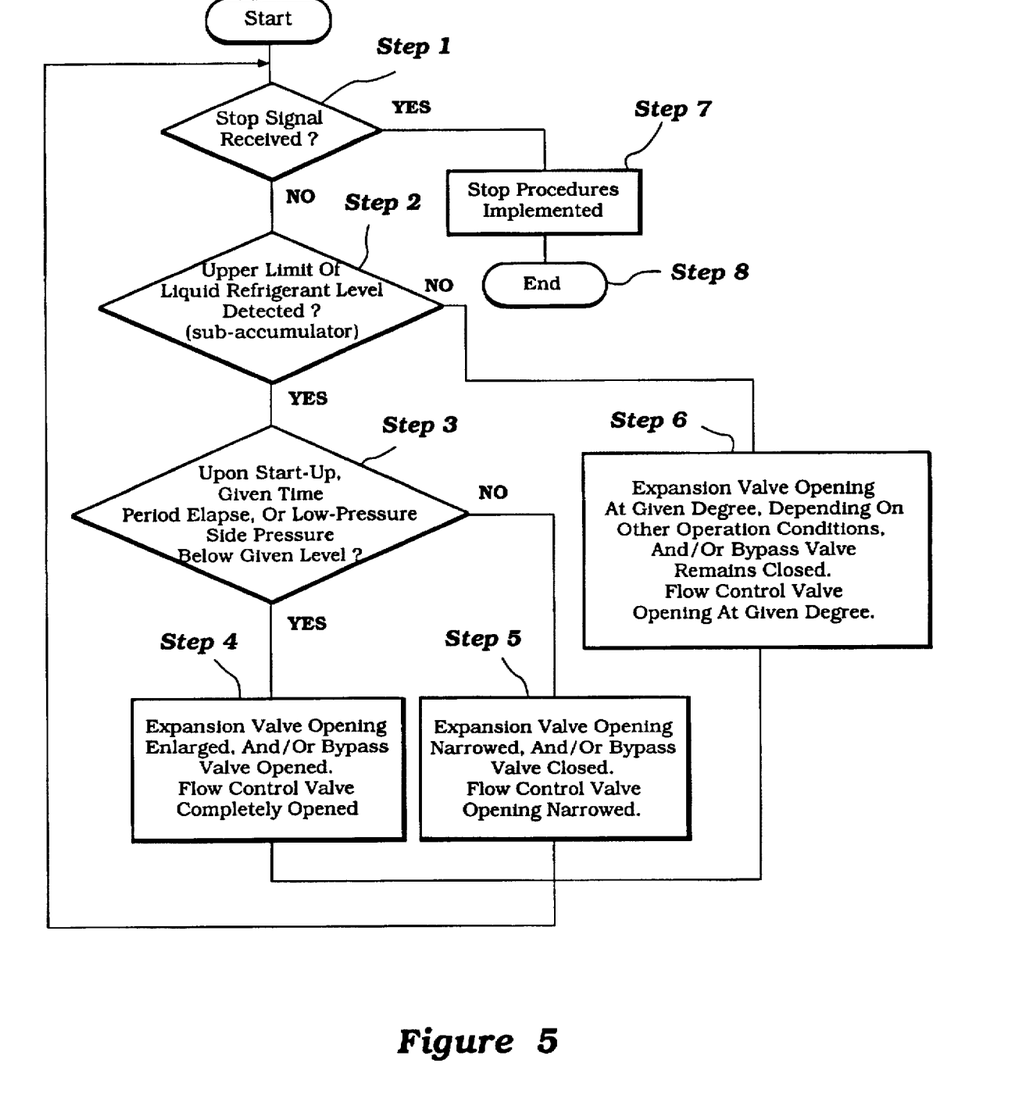
FIG. 5 is a flow chart showing the control flow to control the liquid level of refrigerant according to the first embodiment of the present invention.

FIG. 1 is a schematic circuit illustrating basic structures of an engine-driven heat pump apparatus according to the first embodiment of the present invention. FIG. 2 is a block chart illustrating a control system used in an engine-driven heat pump apparatus according to the first embodiment of the present invention. FIG. 3 is a schematic graph showing a specific characteristic of a temperature-sensitive three-way valve used in a cooling water circulation line. FIG. 4 is a p-i chart showing changes in pressure and enthalpy of a refrigerant in a heating or cooling cycle. FIG. 5 is a flow chart showing the control flow to control the liquid level of refrigerant according to the first embodiment of the present invention.

In FIG. 1, the engine-driven heat pump apparatus is provided with a water-cooled gas engine 1 and the compressors 2 (2A and 2B) driven by the gas engine 1.

The heat pump apparatus comprises a refrigerant circulation line 3 which is a closed loop including compressors 2A and 2B, and a cooling water circulation line 4 which a closed loop including a water pump 26, as shown in FIG. 1. The refrigerant circulation line 3 is a circuit through which a refrigerant such as freon circulates via the compressors 2, which refrigerant circulation line includes refrigerant line 3a from outlets of the compressors 2A and 2B to an oil separator 5, a refrigerant line 3b from the oil separator 5 to a four-way valve 6 in the heating mode, a refrigerant line 3c from the four-way valve 6 to an inside heat-exchanger 8 in the heating mode, a refrigerant line 3d from the inside heat-exchanger 8 to two outside heat-exchangers 11 through expansion valves 8 and through the inside of the accumulator 10, a refrigerant line 3e from the outside heat-exchangers 11 to the four-way valve 6, a refrigerant line 3f from the four-way valve 6 to the accumulator 10 in the heating or cooling mode, a refrigerant line 3g from the accumulator 10 to a sub-accumulator 11, and a refrigerant line 3i from the sub-accumulator 11 to each inlet of the compressors 2A and 2B.

An oil return line 13 and a bypass line 3j are led from the oil separator 5, the oil return line 13 connects the refrigerant line 3g, and the bypass line 3j connects the refrigerant line 3f and is provided with a bypass valve 14. In addition, the refrigerant line 3a (the high pressure line) on the outlet side of the compressor 2 is communicated with the refrigerant line 3i (the low pressure line) on the intake side of the compressor 2 via the bypass line 3m which is provided with a bypass valve 15.

In this embodiment, the accumulator 10 is installed upstream of the compressor 2, and the sub-accumulator 12 is installed between the compressor 2 and the accumulator 10. Level sensors 16 and 17 for sensing the level of the refrigerant (the lower level and the upper level, respectively) are provided in the lower part of the accumulator 10 and the upper part of the sub-accumulator 12, respectively. The bottom of the accumulator 10 is connected to the refrigerant line 3g via a bypass line 3k which is mainly for an oil return. The bypass line 3k is provided with a bypass valve 18. In the above refrigerant circulation line 3, a high pressure sensor 19 for measuring the pressure on the condenser side is provided in the refrigerant line 3b, and a low pressure sensor 20 for measuring the pressure on the evaporator side is provided in the refrigerant line 3i. The level sensors 16 and 17, the low pressure sensor 19 and the high pressure sensor 20 are connected to the control unit 21 as shown in FIG. 2. In addition, the control unit 21 connects a sensor 22 for sensing the start of compressor rotations, and actuators 24 and 25 for controlling the openings of the bypass valves 14 and 15, respectively.

Cooling Water Line

The cooling water circulation line 4 is a line for circulating a cooling water for cooling the gas engine 1 via the water pump 26. The cooling water circulation line 4 is composed of: a cooling water line 4a from the outlet of the water pump 26 to the cooling water inlet of the gas engine through the exhaust gas heat-exchanger 27; a cooling water line 4b from the cooling water outlet of the gas engine 1 to a temperature-sensitive three-way valve 28; a cooling water line 4c from the temperature-sensitive three-way valve 28 to a water flow control valve 29; a cooling water line 4d from the water flow control valve 29 to the inlet of the water pump 26 through the accumulator 10; a cooling water line 4e from the temperature-sensitive three-way valve 28 to the cooling water line 4d; and a cooling water line 4f from the linear-type three-way valve 27 to the cooling water line 4d. The cooling water line 4f includes a heat-exchanger 30 for radiating heat.

The temperature-sensitive three-day valve 28 functions in such a way that when the cooling water temperature is not higher than 60° C., for example, as shown in FIG. 3 (the temperature is detected by a thermostat provided with the three-way valve), the cooling water line 4c is completely closed while the cooling water line 4e is completely open, thereby leading the cooling water only to the cooling water line 4e. When the cooling water temperature is higher than 60° C. but not higher than 75° C., for example, as shown in FIG. 3, the cooling water line 4c partially opens while the cooling water line 4e partially closes, thereby leading the cooling water to both cooling water lines 4c and 4e. When the cooling water temperature is higher than 75° C., for example, as shown in FIG. 3, the cooling water line 4c is completely open while the cooling water line 4e is completely closed, thereby leading the cooling water only to the cooling water lines 4c. $I_1$ and $I_2$ indicate the amount of cooling water circulating through the cooling water lines 4c and 4e, respectively.

Heating Operation of Heat Pump Apparatus

Heating operation of the above heat pump apparatus will be explained with reference to a p-i chart shown in FIG. 4.

When the compressors 2A and 2B are driven by engine revolutions as described above, the vaporized refrigerant in a state marked (1) in FIG. 4 (pressure $P_1$ and enthalpy $i_1$) is introduced into the compressors 2A and 2B from the refrigerant circulation line 3i, compressed, and changed to a state marked (2) in FIG. 4 (pressure $P_2$ and enthalpy $i_2$) in which the refrigerant is under a high pressure with a high temperature. The necessary power of the compressors 2A and 2B per unit weight of the refrigerant, AL, is expressed as $(i_2-i_1)$. The pressure of the refrigerant introduced into the compressors 2A and 2B, $P_1$, is detected by the low pressure sensor 20, and input into the control unit 21.

The above vaporized refrigerant under a high pressure with a high temperature is led to the oil separator 5 through the refrigerant line 3a, and the oil is removed therefrom by the oil separator 5. The oil-free vaporized refrigerant is moved to the four-way valve 6 through the refrigerant line 3b. The oil separated from the refrigerant by the oil separator 5 is returned to the refrigerant line 3g through the oil return line 13. The pressure of the refrigerant, under a high pressure with a high temperature, circulating through the refrigerant line 3b, $P_2$ (pressure loss is negligible), is detected by the high pressure sensor 19, and input into the control unit 21.

In the heating mode, port "a" and port "b" of the four-way valve 6 are communicated with port "c" and port "d", respectively. The vaporized refrigerant under a high pressure with a high temperature flows into the refrigerant line 3c via the four-way valve 6 and then the inside heat-exchanger 8 functioning as condensers. The vaporized refrigerant under a high pressure with a high temperature introduced into the inside heat-exchanger 8 is liquefied while radiating heat of condensation $Q_2$ to the air in a room, and sub-cooled to a state marked (3) in FIG. 4 (pressure $P_2$ and enthalpy $i_3$) so as to liquefy the refrigerant, thereby heating the room using radiated heat $Q_2$ (=$i_2$–$i_3$).

The refrigerant under a high pressure and liquefied at the inside heat-exchanger 8 undergoes drastic reduction of pressure by the expansion valves 8, and is changed to a state marked (4) in FIG. 4 (pressure $P_1$ and enthalpy $i_3$), in which a portion of the refrigerant is vaporized and the vapor-liquid refrigerant flows in the refrigerant line 3d towards the outside heat-exchangers 11.

Meanwhile, the cooling water circulating in the cooling water circulation line 4 by operation of the water pump 26 is pushed out of the water pump 26, flows in the cooling water line 4a, absorbs heat from the exhaust gas heat-exchanger 27, and further absorbs heat from the gas engine 1, thereby cooling the gas engine 1 while absorbing heat. The cooling water used for cooling the gas engine 1 flows in the cooling water line 4b, and reaches the temperature-sensitive three-way valve 28.

In the above, when the cooling water temperature is low at the beginning of operation of the gas engine 1, e.g., not higher than 60° C., as describe earlier with reference to FIG. 3, the temperature-sensitive three-way valve 28 completely closes the cooling water line 4c while completely opening the cooling water line 4e, thereby returning all the cooling water to the water pump 26 through the cooling water line 4e. Accordingly, the temperature of the cooling water is elevated, thereby quickly warming the gas engine 1 which is cool.

When the cooling water temperature is higher than 60° C. but not higher than 75° C., the cooling water line 4c partially opens while the cooling water line 4e partially closes, and when the cooling water temperature is higher than 75° C., the cooling water line 4c is completely open while the cooling water line 4e is completely closed, thereby leading all the cooling water to the accumulator 10 through the cooling water lines 4c and 4d.

In the accumulator 10, the refrigerant circulating through the refrigerant line 3d and the liquefied refrigerant accommodated in the accumulator 10 are heated by the cooling water circulating through the cooling water line 4d, i.e., exhaust heat from the gas engine 1 (transmitted heat from the exhaust gas and absorbed heat from the gas engine 1 through the cooling water) is exerted on the refrigerant.

The refrigerant circulating through the refrigerant line 3d flows into the outside heat-exchangers 11 after being heated by the exhaust heat from the gas engine 1 in the accumulator 10 as described above, in which outside heat-exchanger the refrigerant is vaporized by absorbing heat of evaporation from the outside air. If the temperature of the outside air is higher than a given level, the fans 11a of the outside heat-exchangers 11 are operated, thereby enhancing absorption of heat from the outside air in the outside heat-exchangers 11.

The refrigerant moves from the outside heat-exchangers 11 to the four-way valve 6 through the refrigerant line 3e, in which port "b" and port "d" of the four-way valve 6 are communicated with each other in the heating mode, thereby leading the refrigerant to the refrigerant line 3f via the four-way valve 6, and reaching the accumulator 10. In the accumulator 10, the vapor-liquid refrigerant is separated into the vapor refrigerant and the liquid refrigerant. The liquid refrigerant receives exhaust heat from the gas engine 1 via the cooling water circulating through the cooling water line 4d, and partially vaporizes. The vapor refrigerant in the accumulator 10 is moved to the sub-accumulator 11, and further moved to the compressors 2A and 2B through the refrigerant line 3i. The state of the vapor refrigerant is returned to a state marked (1) in FIG. 4 (pressure $P_1$ and enthalpy $i_1$), and the vapor refrigerant is again compressed by the compressors 2A and 2B, thereby repeating the same operation as described above.

The refrigerant receives exhaust heat from the gas engine 1 in the accumulator 10 and heat from the outside air in the outside heat-exchangers 11, during a period between reduction of pressure by the expansion valves 8 and introduction to the compressors 2A and 2B, whereby the refrigerant is vaporized and further superheated by receiving heat $Q_1$ (=$i_1$–$i_3$).

Accordingly, in the heating mode, exhaust heat from the gas engine 1 is exerted on the refrigerant through the cooling water absorbing heat, and added to heat originally radiated from the inside heat-changers 8, thereby improving heating power to obtain radiated heat $Q_2$.

Cooling Operation

The engine-driven heat pump apparatus according to the present invention can be used as an air conditioner for cooling a room by reversing the flow of the refrigerant, i.e., manipulating the four-way valve 6. That is, in the cooling mode, the inside heat-exchanger 8 functions as an evaporator while the outside heat-exchanger 11 functions as a condenser, and the refrigerant circulates in the same cycle in the p-i chart shown in FIG. 4 as in the heating mode, whereby the inside heat-exchanger 8 absorbs heat of evaporation from the air in the room and cools the room.

The operation to inhibit foaming of refrigerant in the cooling mode can be conducted basically in the same way as in the heating mode, particularly when a flow control valve 7b for adjusting the refrigerant flow upstream of the accumulator 10, which valve is installed between the four-way valve 6 and the accumulator 10, is used. Instead of the flow control valve 7b, a flow control valve 7a can be used particularly in the cooling mode. Operation of the flow control valve will be explained below.

Operation for Inhibition of Foaming

In the above embodiment, as described earlier, the sub-accumulator 12 is installed between the accumulator 10 and the compressor 2, and provided with the level sensor 17 for sensing the upper limit of liquid refrigerant at the upper part thereof, and the level sensor 16 for sensing the lower limit of liquid refrigerant at the lower part thereof.

In this embodiment, in order to prevent a liquid refrigerant return to the compressor 2, the upper level of liquid refrigerant in the sub-accumulator 12 is detected so as to keep the upper level of liquid refrigerant in the sub-accumulator 12 below a given level. The control flow will be explained with reference to FIG. 5.

When the heat pump apparatus is started up, it is determined whether a stop signal is received (step 1 in FIG. 5). In the absence of a stop signal, it is determined whether the upper limit of the liquid refrigerant level in the sub-accumulator 12 is detected by the liquid-level sensor 17 (step 2 in FIG. 5). If the upper level of refrigerant reaches the upper limit, it is determined whether a given time period elapses since the compressor 2 is started or whether the pressure in the low pressure refrigerant line 3i detected by the low pressure sensor 20 is below a given level (step 3 in FIG. 5). If the given time period does not elapse once the compressor 2 is started (the beginning of start-up), or if the pressure in the low pressure refrigerant line 3i is below the given level, the control unit 21 enlarges the opening of the expansion valve 9 by sending a signal to the actuator 23 for controlling the opening of the expansion valve, and/or opens the bypass valves 14 and 15 in the respective bypass lines 3j and 3m by sending a signal to the respective actuators 24 and 25 for controlling the opening of the valves 14 and 15 (step 4 in FIG. 5), because, under the above conditions, foaming described earlier easily occurs due to abrupt and intense reduction of pressure in the accumulator 10 and the sub-accumulator 12. Although at least one of the above opening and pressure controls should be conducted, either or both can be selected, depending on the likelihood of the occurrence of foaming. Accordingly, the pressure in the accumulator 10 and the sub-accumulator 12 increases, thereby inhibiting boiling of the liquid refrigerant and preventing a liquid refrigerant return to the compressor 2 via mitigation of the occurrence of foaming. Under the above conditions, although the flow control valve 7b (the flow control valve 7a is not used) is normally completely open at the very beginning of the start-up, the opening of the valve 7b may be adjusted afterwards, depending on the pressure in the accumulator 10 and the sub-accumulator 12.

If the given time period elapses once the compressor 2 is started, or if the pressure in the low pressure refrigerant line 3i is higher than the given level, the control unit 21 closes the opening of the expansion valve 9 by sending a signal to the actuator 23 for controlling the opening of the expansion valve, and/or closes the bypass valves 14 and 15 in the respective bypass lines 3j and 3m by sending a signal to the respective actuators 24 and 25 for controlling the opening of the valves 14 and 15, and closes the flow control valve 7b (7a is not used) completely or partially (step 5 in FIG. 5). At this time, even if the refrigerant flows into the accumulator 10 and the sub-accumulator 12 through the flow control valve 7b, the intensity of foaming remains low since the liquid levels of refrigerant in the accumulator 10 and the sub-accumulator 12 are very low, and the pressure in the accumulator 10 and the sub-accumulator 12 is not low.

If the liquid-level sensor 17 does not detect the upper limit of the liquid refrigerant level due to a decrease in the liquid level in the sub-accumulator 12, i.e., the liquid level of refrigerant is below the upper limit, the expansion valve 9 is set at a normal opening depending on other operation conditions, the bypass valves 14 and 15 remain closed, and the flow control valve 7b is appropriately opened (step 6 in FIG. 5). This is normal operation. The bypass valves 14 and 15 can be adjusted depending on other operation conditions.

If a stop signal is received, the shut-off process is initiated, and the apparatus is shut off (step 8 in FIG. 5).

In this embodiment, when the likelihood of the occurrence of foaming is high, i.e., at the start-up of the compressor 2 for a given time, or when the pressure in the low pressure refrigerant line 3i is below a given level, the pressure in the accumulator 10 and the sub-accumulator 12 is increased, or the refrigerant flow is reduced, thereby reducing the liquid level of refrigerant in the sub-accumulator 12 and effectively preventing the refrigerant from entering the compressor 2. Accordingly, the life span of the compressor 2 is improved. In steps 4, 5, and 6 in FIG. 5, the expansion valve 9, the flow control valve 7b, the bypass valves 14 and 15 can be controlled singly or in any combination. If only one of them is controlled, the control of the bypass valve 15 is effective.

EMBODIMENT 2

Accumulator with Level Sensor

Figure 6:
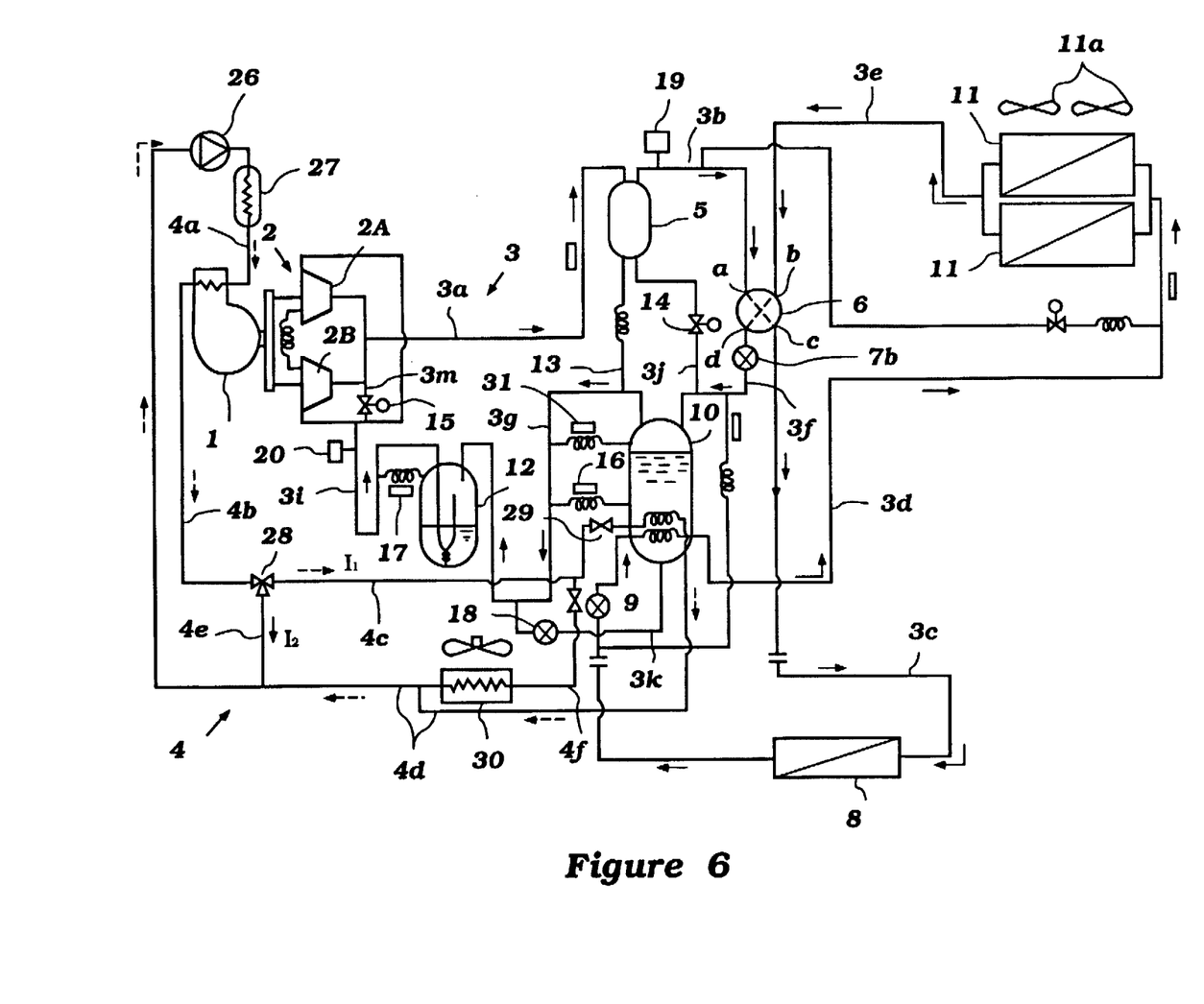
FIG. 6 is a schematic circuit illustrating basic structures of an engine-driven heat pump apparatus according to the second embodiment of the present invention.
Figure 7:
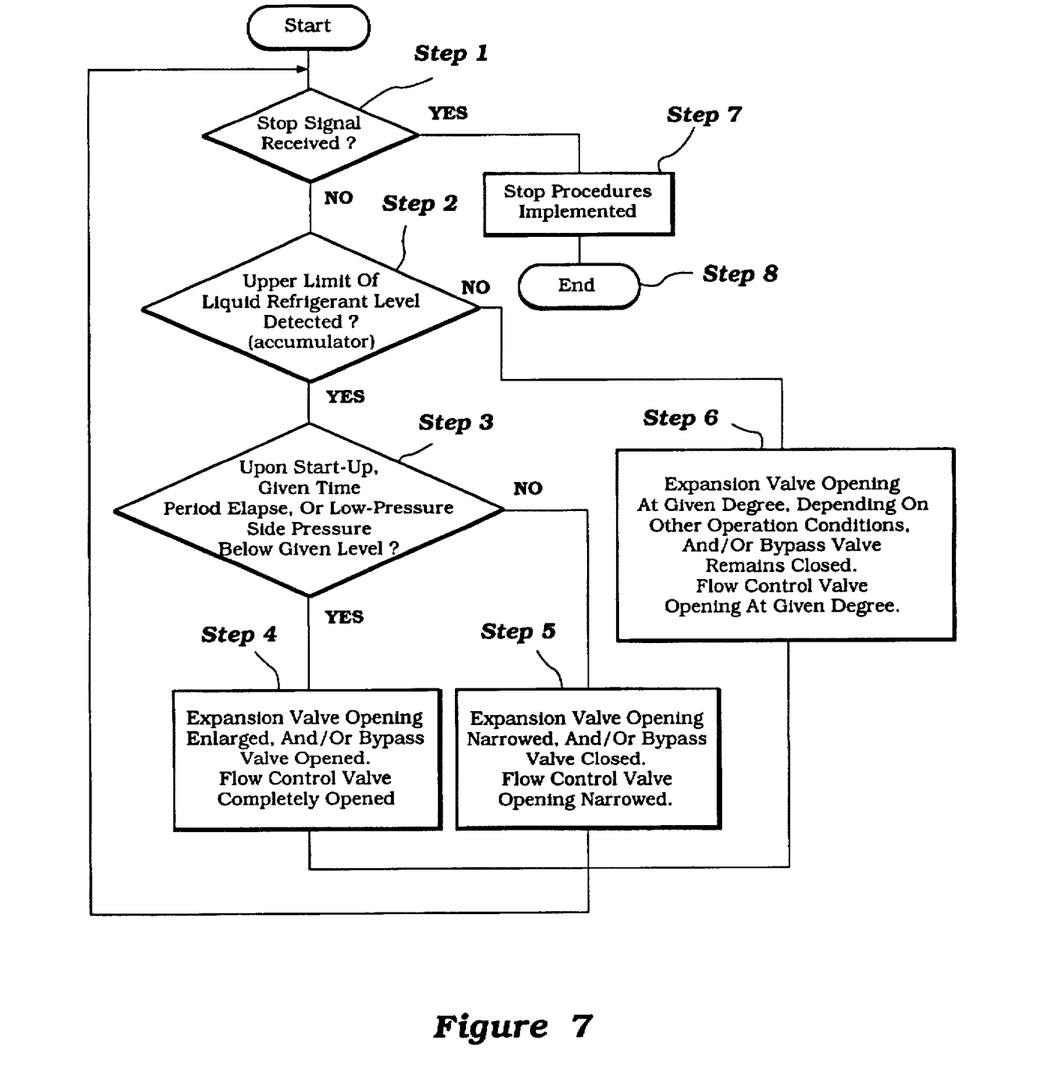
FIG. 7 is a flow chart showing the control flow to control the liquid level of refrigerant according to the second embodiment of the present invention.

The second embodiment of the present invention will be explained with reference to FIGS. 6 and 7. FIG. 6 is a schematic circuit illustrating basic structures of an engine-driven heat pump apparatus according to the second embodiment of the present invention. FIG. 7 is a flow chart showing the control flow to control the upper liquid level of refrigerant according to the second embodiment of the present invention.

In the second embodiment, the liquid-level sensor 17 provided in the sub-accumulator 12 in the first embodiment is removed. Instead, a liquid-level sensor 31 is provided in the accumulator 10 so as to detect the upper limit of the level of liquid refrigerant inside the accumulator 10. In FIG. 6, the remaining structures are identical to that of the first embodiment. Therefore, an explanation for the elements having the same reference numbers as FIG. 1 will be omitted.

In the second embodiment, the control of the liquid refrigerant level is the same as described in the first embodiment. If the level of the liquid refrigerant is detected to be at the upper limit inside the accumulator 10 by the liquid-level sensor 31, the upper liquid level is controlled in the same manner as in the first embodiment (see FIG. 7). Accordingly, the liquid refrigerant is prevented from entering the compressor 2, allowing improved durability of the compressor 2.

In the second embodiment it is also possible to control the upper liquid level with the expansion valve 9, the flow control valve 7b, the bypass valves 14 and 15, singly or in any combination. Foaming can be prevented solely by controlling the bypass valve 15.

EMBODIMENT 3

Accumulator and Sub-Accumulator both with Level Sensor

Figure 8:
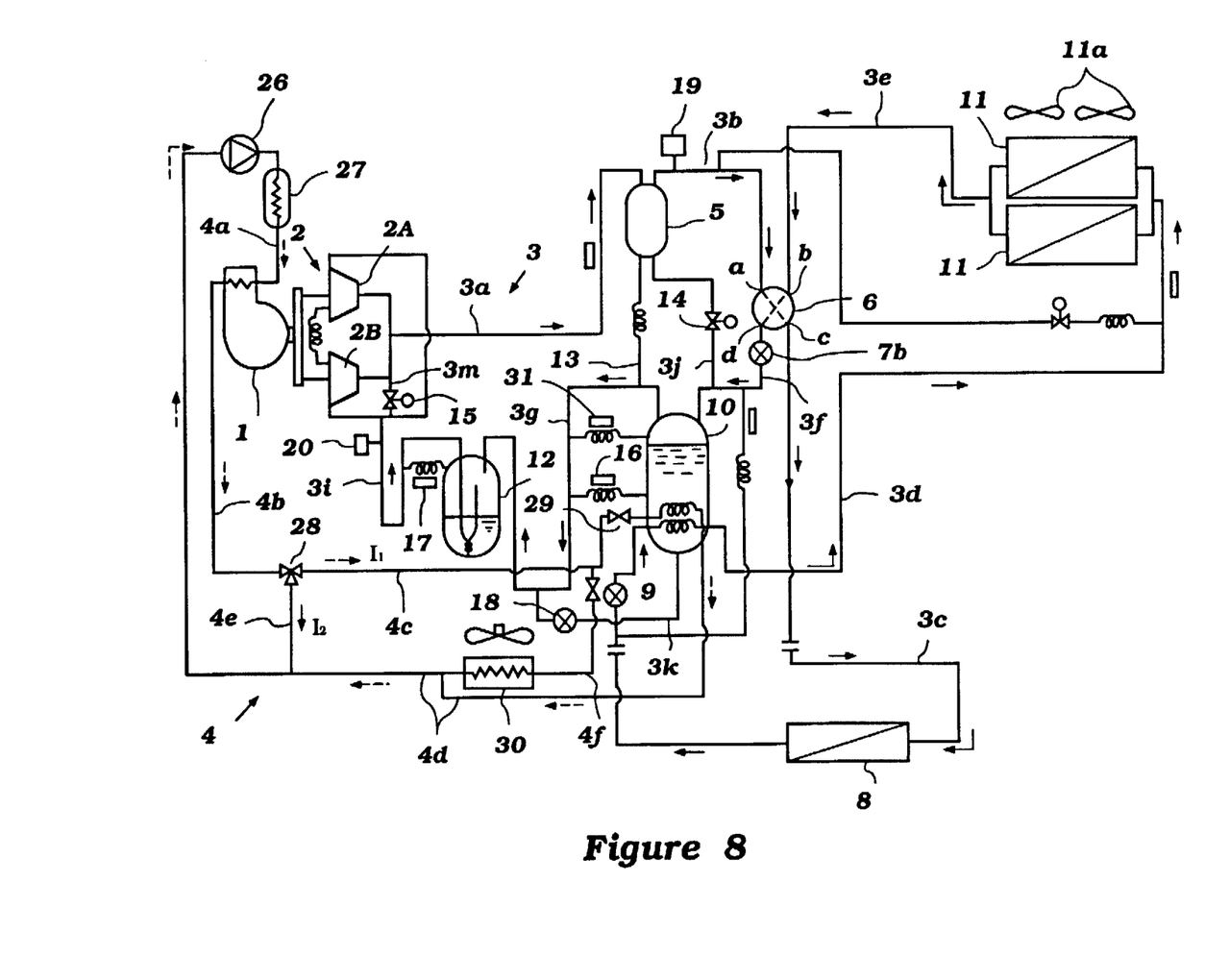
FIG. 8 is a schematic circuit illustrating basic structures of an engine-driven heat pump apparatus according to the third embodiment of the present invention.
Figure 9:
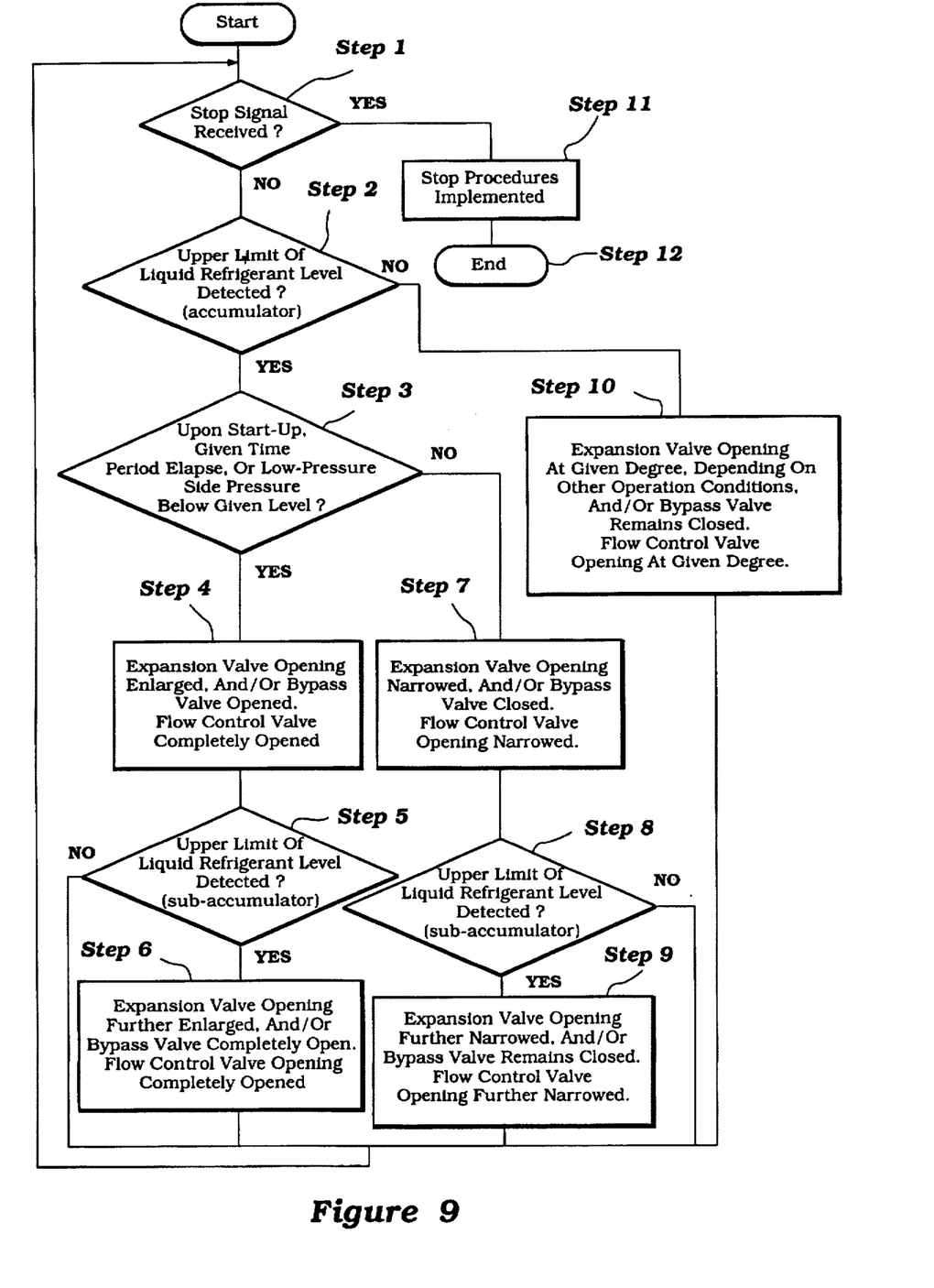
FIG. 9 is a flow chart showing the control flow to control the liquid level of refrigerant according to the third embodiment of the present invention.

The third embodiment of the present invention will be explained with reference to FIGS. 8 and 9. FIG. 8 is a schematic circuit illustrating basic structures of an engine-driven heat pump apparatus according to the third embodiment of the present invention. FIG. 9 is a flow chart showing the control flow to control the upper liquid level of refrigerant according to the third embodiment of the present invention.

In the third embodiment, the liquid-level sensors 31 and 16 are provided at the upper and lower parts of the accumulator 10. In addition, the liquid-level sensor 17 is provided in the sub-accumulator 12. In FIG. 8, the remaining structures are identical to that of the first and second embodiments. Therefore, an explanation for the elements having the same reference numbers as FIGS. 1 and 6 will be omitted.

Thus, in this embodiment, the upper limits of the level of the liquid refrigerant inside the accumulator 10 and sub-accumulator 12 are controlled based on the procedures shown in FIG. 9. That is, in FIG. 9, steps 1 through 4 function to control the liquid level in the same manner as in the second embodiment (see FIG. 6). When foaming easily occurs at the beginning of start-up of the compressor 2 or when the pressure in the low pressure refrigerant line 3i is lower than a given level, the opening of the expansion valve 9 is enlarged, and/or the bypass valves 14 and 15 are opened (step 4 in FIG. 9), and it is then determined whether the upper level of the liquid refrigerant inside the sub-accumulator 12 is detected at the upper limit (step 5 in FIG. 9). If the upper level of the liquid refrigerant inside the sub-accumulator 12 is over the upper limit, the expansion valve 9 is opened even more, and/or the bypass valves 14 and 15 are completely opened (step 6 in FIG. 9). As a result, the pressure inside the accumulator 10 and sub-accumulator 12 is further increased so that foaming is prevented.

After a given interval once the compressor 2 is started up, or when the pressure of the low pressure refrigerant line 3i increases higher than a given level, the opening of the expansion valve 9 is narrowed, and/or the bypass valves 14 and 15 are closed, and the opening of the flow control valve 7 is narrowed (step 7 in FIG. 9). Although at least one of the above opening and pressure controls should be conducted, either or both can be selected, depending on the likelihood of the occurrence of foaming. Subsequently, it is determined whether the upper limit of the level of the liquid refrigerant inside the sub-accumulator 12 is detected by the liquid-level sensor 17 (step 8 in FIG. 9). If the upper level of the liquid refrigerant in the sub-accumulator 12 is over the upper limit, the opening of the expansion valve 9 is further narrowed, and/or the opening of the flow control valve 7 is further narrowed (step 9 in FIG. 9). Accordingly, the refrigerant flowing into the accumulator 10 is further reduced and the upper level of the liquid refrigerant is further lowered, thereby preventing the refrigerant from entering the compressor 2, and allowing for improvement in the durability of the compressor 2.

It will be understood by those of skill in the art that numerous variations and modifications can be made without departing from the spirit of the present invention. Therefore, it should be clearly understood that the forms of the present invention are illustrative only and are not intended to limit the scope of the present invention.

We claim:

1. A method for stable operation of a heat pump apparatus comprising, in a refrigerant circulation line through which a refrigerant circulates, said refrigerant circulation line comprising: a compressor for circulating said refrigerant; a condenser; an expansion valve; an evaporator; an accumulator for accommodating said refrigerant arranged upstream of said compressor; and a sub-accumulator for additionally accommodating said refrigerant arranged between said accumulator and said compressor, said sub-accumulator provided with a level sensor for sensing the liquid refrigerant level in said sub-accumulator, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; and (c) reducing the refrigerant flow upstream of at least said accumulator or said sub-accumulator when said upper level of the refrigerant detected by said level sensor reaches said predetermined upper limit, thereby inhibiting foaming of the refrigerant in at least said sub-accumulator.

2. The method for stable operation according to claim 1, wherein step (c) of reducing the refrigerant flow comprises reducing the refrigerant flow in said refrigerant circulation line upstream of said sub-accumulator and downstream of said evaporator.

3. A method for stable operation of a heat pump apparatus comprising, in a refrigerant circulation line through which a refrigerant circulates, said refrigerant circulation line comprising: a compressor for circulating said refrigerant; an inside heat-exchanger for exchanging heat between said refrigerant and the air inside a room; an expansion valve; an outside heat-exchanger for exchanging heat between said refrigerant and the air outside said room; a four-way valve for reversing the flow of said refrigerant at said inside heat-exchanger and at said outside heat-exchanger; an accumulator for accommodating said refrigerant arranged upstream of said compressor; a sub-accumulator for additionally accommodating said refrigerant arranged between said accumulator and said compressor, at least one of said accumulator and said sub-accumulator provided with a level sensor for sensing the liquid refrigerant level therein; and at least one bypass line arranged in parallel to said expansion valve, for bypassing said expansion valve, said at least one bypass line provided with a bypass valve therein, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; and (c) at least enlarging the opening of said expansion valve or opening said bypass valve when said upper level of the refrigerant detected by said level sensor reaches said predetermined upper limit, thereby inhibiting foaming of the refrigerant in at least said sub-accumulator.

4. The method for stable operation according to claim 3, wherein said at least one bypass line is provided at a location on said refrigerant circulation line bridging a point downstream of said compressor and a point upstream of said compressor.

5. A method for stable operation of a heat pump apparatus comprising, in a refrigerant circulation line through which a refrigerant circulates, said refrigerant circulation line comprising: a compressor for circulating said refrigerant; an inside heat-exchanger for exchanging heat between said refrigerant and the air inside a room; an expansion valve; an outside heat-exchanger for exchanging heat between said refrigerant and the air outside said room; a four-way valve for reversing the flow of said refrigerant at said inside heat-exchanger and at said outside heat-exchanger; an accumulator for accommodating said refrigerant arranged upstream of said compressor; a sub-accumulator for additionally accommodating said refrigerant arranged between said accumulator and said compressor, at least one of said accumulator and said sub-accumulator provided with a level sensor for sensing the liquid refrigerant level therein; a flow control valve for adjusting the refrigerant flow upstream of said accumulator or said sub-accumulator; and at least one bypass line arranged in parallel to said expansion valve, for bypassing said expansion valve, said at least one bypass line provided with a bypass valve therein, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; (c) when said upper level of the refrigerant detected by said level sensor reaches said predetermined upper limit, conducting at least one step selected from the group consisting of: (i) narrowing the opening said flow control valve; and (ii) at least enlarging the opening of said expansion valve or opening said bypass valve, thereby inhibiting foaming of the refrigerant in at least said sub-accumulator.

6. The method for stable operation according to claim 5, wherein said flow control valve is provided in the refrigerant circulation line upstream of said sub-accumulator and downstream of said four-way valve.

7. The method for stable operation according to claim 5, wherein said at least one bypass line is provided at a location on said refrigerant circulation line bridging a point downstream of said compressor and a point upstream of said compressor.

8. A method for stable operation of a heat pump apparatus comprising, in a refrigerant circulation line through which a refrigerant circulates, said refrigerant circulation line comprising: a compressor for circulating said refrigerant; an inside heat-exchanger for exchanging heat between said refrigerant and the air inside a room; an expansion valve; an outside heat-exchanger for exchanging heat between said refrigerant and the air outside said room; a four-way valve for reversing the flow of said refrigerant at said inside heat-exchanger and at said outside heat-exchanger; an accumulator for accommodating said refrigerant arranged upstream of said compressor; a sub-accumulator for additionally accommodating said refrigerant arranged between said accumulator and said compressor, at least one of said accumulator and said sub-accumulator provided with a level sensor for sensing the liquid refrigerant level therein; a flow control valve for adjusting the refrigerant flow upstream of said accumulator or said sub-accumulator; and at least one bypass line arranged in parallel to said expansion valve, for bypassing said expansion valve, said at least one bypass line provided with a bypass valve therein, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; (c) at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, conducting at least one step selected from the group consisting of (i) the opening of said expansion valve is enlarged; (ii) said at least one bypass valve is opened; and (iii) the opening of said flow control valve is opened; and (d) at least after said given time period elapses after the start-up of said compressor or after the pressure in said refrigerant circulation line downstream of said expansion valve and upstream of said compressor reaches or exceeds said given level, when said level sensor detects the upper level of the refrigerant in at least said accumulator or said sub-accumulator at a given upper limit, conducting at least one step selected from the group consisting of (i) the opening of said expansion valve is narrowed; (ii) said at least one bypass valve is closed; and (iii) the opening of said flow control valve is narrowed, thereby inhibiting foaming of the refrigerant in at least said sub-accumulator.

9. A method for stable operation of a heat pump apparatus comprising, in a refrigerant circulation line through which a refrigerant circulates, said refrigerant circulation line comprising: a compressor for circulating said refrigerant; an inside heat-exchanger for exchanging heat between said refrigerant and the air inside a room; an expansion valve; an outside heat-exchanger for exchanging heat between said refrigerant and the air outside said room; a four-way valve for reversing the flow of said refrigerant at said inside heat-exchanger and at said outside heat-exchanger; an accumulator for accommodating said refrigerant arranged upstream of said compressor; a sub-accumulator for additionally accommodating said refrigerant arranged between said accumulator and said compressor, at least one of said accumulator and said sub-accumulator provided with a level sensor for sensing the liquid refrigerant level therein; a flow control valve for adjusting the refrigerant flow upstream of said accumulator or said sub-accumulator; and at least one bypass line arranged in parallel to said expansion valve, for bypassing said expansion valve, said at least one bypass line provided with a bypass valve therein, said method comprising the steps of: (a) predetermining an upper limit of the level of the liquid refrigerant in at least said accumulator or said sub-accumulator so as to inhibit foaming of the refrigerant in at least said sub-accumulator; (b) detecting the upper level of the liquid refrigerant in said at least said accumulator or said sub-accumulator by said level sensor after the start-up of said compressor; (c) at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, conducting at least one step selected from the group consisting of (i) the opening of said expansion valve is enlarged; (ii) said at least one bypass valve is opened; and (iii) the opening of said flow control valve is opened; (d) subsequently to step (c), but at least before a given time period elapses after the start-up of said compressor or before the pressure in said refrigerant circulation line downstream of said expansion valve and upstream of said compressor reaches or exceeds a given level, when said level sensor detects the upper level of the refrigerant in at least said accumulator or said sub-accumulator at a given upper limit, conducting at least one step selected from the group consisting of (i) the opening of said expansion valve is further enlarged; (ii) said at least one bypass valve is further opened; and (iii) the opening of said flow control valve is further opened; (e) at least after said given time period elapses after the start-up of said compressor or after the pressure in said refrigerant circulation line downstream of said expansion valve and upstream of said compressor reaches or exceeds said given level, when said level sensor detects the upper level of the refrigerant in at least said accumulator or said sub-accumulator at a given upper limit, conducting at least one step selected from the group consisting of (i) the opening of said expansion valve is narrowed; (ii) said at least one bypass valve is closed; and (iii) the opening of said flow control valve is narrowed; and (f) subsequently to step (e), when said level sensor detects the upper level of the refrigerant in at least said accumulator or said sub-accumulator at a given upper limit, conducting at least one step selected from the group consisting of (i) the opening of said expansion valve is further narrowed; (ii) the opening of said at least one bypass valve is further narrowed; and (iii) the opening of said flow control valve is further narrowed.

10. A method for stable operation of a heat pump apparatus comprising, in a refrigerant circulation line through which a refrigerant circulates, said refrigerant circulation line comprising: a compressor for circulating said refrigerant; a condenser; an evaporation valve; an evaporator; an accumulator for accommodating said refrigerant arranged upstream of said compressor; and a sub-accumulator for additionally accommodating said refrigerant arranged between said accumulator and said compressor; at least one bypass line arranged in parallel to said expansion valve, for bypassing said expansion valve, said at least one bypass line provided with a bypass valve therein, said method comprising at least one of the following steps of:
(a) before a given time period elapses after the start-up of said compressor, said bypass valve is open, and when said given time period elapses, said bypass valve is closed;
(b) when the pressure in the refrigerant circulation cycle on the low pressure side is lower than a given level after the start-up of said compressor, said bypass valve is opened, and when the pressure reaches said given level, said bypass valve is closed;
(c) before a given time period elapses after the start-up of said compressor, the opening of said expansion valve is increased from the initial setting, and when said given time period elapses, the opening of said expansion valve is returned to the initial setting; and
(d) when the pressure in the refrigerant circulation cycle on the low pressure side is lower than a given level after the start-up of said compressor, the opening of said expansion valve is increased from the initial setting, and when the pressure reaches said given level, the opening of said expansion valve is returned to the initial setting.

* * * * *